Patented Dec. 5, 1950

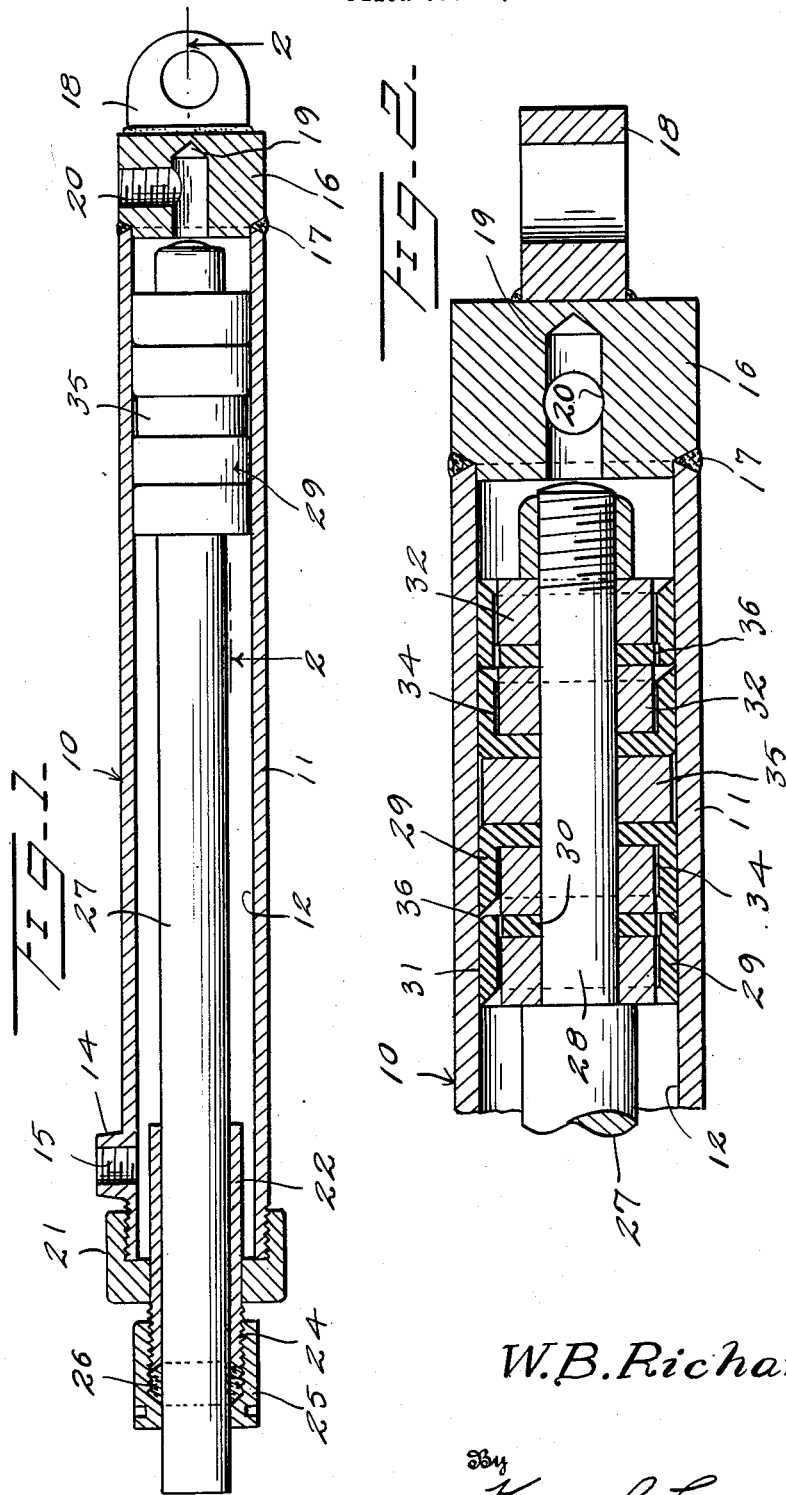

2,532,422

UNITED STATES PATENT OFFICE 2,532,422

HYDRAULIC RAM AND SEALING RINGS

Walter B. Richardson, Bridgton, Maine

Application October 2, 1946, Serial No. 700,674

1 Claim. (Cl. 309—33)

This invention relates to hydraulic rams and sealing rings and more particularly to the construction of the cylinder body and the piston seals therein.

It is an object of this invention to provide a hydraulic piston and cylinder of the kind to be more particularly described hereinafter, having multiple sealing rings on the piston, the rings being so constructed and arranged that the rings behind the outermost ring will be properly lubricated and held in contact with the inner walls of the cylinder by liquid passing through orifices in the outermost ring.

Another object of this invention is to provide a hydraulic cylinder, piston and sealing rings therefor in which the sealing rings will be pressed into engagement with the cylinder walls by the pressure of the liquid or fluid being compressed thereby, certain of the rings being so constructed and arranged that a certain amount of fluid under pressure will be admitted for sealing the rearwardly adjacent rings whereby a more complete seal will be maintained and the rearward rings will not become worn out due to lack of lubrication.

A further object of this invention is to provide a double-acting hydraulic ram wherein the cylinder is so constructed that the ports therein will not be covered by the piston rings or head in any position of the piston.

A still further object of this invention is to provide a hydraulic ram having a cylinder and a piston with sealing rings so constructed that all of the rings will be lubricated by the fluid being pumped and having a removable cap on one end of the cylinder for ready disassembly of the ram, the cap being constructed with a piston bearing and a limiting stop for preventing the piston head from covering the cylinder port at that end of the cylinder.

With the above and other objects in view, my invention consists in the arrangement, combination and details of construction disclosed in the drawings and specification, and then more particularly pointed out in the appended claim.

In the drawings,

Figure 1 is a longitudinal section of my hydraulic ram, and

Figure 2 is an enlarged fragmentary section taken on the line 2—2 of Figure 1.

Referring to the drawings, the numeral 10 designates generally a hydraulic ram constructed according to an embodiment of my invention. The ram 10 is formed with an elongated cylindrical body 11 having a concentric longitudinal bore 12 therethrough, the bore 12 providing the inner cylinder walls of the ram 10. The body 11 is formed near one end with a radially extending boss 14 on the outer side. A bore 15 is provided through the boss 14 to form a port through which the fluid may enter or leave the cylinder.

One end of the cylinder 11 is closed by a head 16 which may be welded, as at 17, to the cylinder and the head 16 is formed with an apertured ear or lug 18 on the outer end for attachment to a support. The head 16 is formed with a recess 19 concentric to the head 16 and cylinder 11, opening into the end of the cylinder 11, and a bore 20, at right angles to the recess 19, provides a port for fluid into or out of the ram 10.

The other end of the cylinder 11 is closed with a cap 21 which is cup-shaped and threadably engages over the end of the cylinder. The cap 21 is provided with an elongated cylindrical bearing sleeve 22 concentric thereto which is adapted to extend into the cylinder 11 beyond the port 14 and is spaced inwardly from the walls 12 of the cylinder. The bearing sleeve 22 also extends outwardly from the cap 21 and is provided with exterior threads 24 on the outer extension. A gland nut 25 is adapted to engage over the threads 24 for securing a packing 26 between the nut 25 and the end of the bearing sleeve 22.

A piston rod 27 is slidable in the cylinder 11 and extends through the bearing sleeve 22. The inner end of the rod 27 is of reduced diameter, as at 28 for supporting the sealing rings thereon. Cup-shaped sealing rings 29 are secured on the rod 28 and may be made of rubber, neoprene or other suitable resilient flexible material. Each ring 29 is formed with a substantially flat base portion 30 having an annular flange 31 extending therefrom. The outer edge of the flange 31 is beveled inwardly, as at 32, whereby pressure of the fluid will press the flanges 31 outwardly into engagement with the cylinder walls 12 to provide a seal therebetween. The seals 29 are fixed on the rod 28 by being clamped between adjacent annular washers or discs 32 slidable on the rod 29. The washers 32 are of a thickness substantially equal to the depth of the flanges 31 of the rings 29, and are of a diameter substantially less than the inner diameter of the rings 29, whereby the washers 32 are encompassed within the confines of the flanges 31 and a space, as at 34, is provided between the annular edge of the washers 32 and the inner surface of the flanges 31.

The seals 29 are adapted to be positioned on the shaft 28 with the flanges 31 directed in the direction of the stroke of the piston rod 27, facing the fluid under pressure. In a double acting piston, as shown in Figures 1 and 2, those seals 29 adjacent the pressure fluid will be directed opposite to those at the other end of the rod 28 and the oppositely directed seals 29 are spaced apart by a washer or spacer 35 of a diameter less than the bore 12.

In operation of the ram 10, when the piston 27 is moving to the right, as viewed in the drawings, the fluid pressure will be exerted on the ring 29 in the space 32, thus pressing the flange 31 against the cylinder wall. As the cylinder wall beyond the outermost seal 29 is in contact with the fluid, the outermost ring will be lubricated by this fluid on the walls but as the seal is tight on the cylinder wall, the fluid will be scraped off and the wall will be dry when in contact with the following seal. Such a condition exaggerates the wear on the following seals and lessens the usefulness of the added seals. To overcome this condition, I have provided small orifices 36 in the rings 29, through the base 30 at the corner of the base and flange 31 in the outer ring 29, whereby a restricted amount of fluid under pressure will be admitted to the rearward seal to lubricate this seal and to press it into sealing engagement with the cylinder walls.

The nut 37 on the threaded end of the rod 28 clamps the bases 30 of the seals 29 between adjacent washers 32 for securing them on the piston 27.

By such an arrangement a piston head is formed in the rod 27, the piston head comprising the washers 35 and rings 29.

I do not mean to confine myself to the exact details of construction herein disclosed but claim all variations falling within the purview of the appended claim.

What I claim is:

In a hydraulic ram having a cylindrical body, a piston rod slidable in said body, said rod formed with a reduced diameter portion on the end thereof in said body, a pair of sealing rings on said reduced diameter portion of said rod, a second pair of sealing rings on said reduced portion, a spacer between said pairs of rings, each of said sealing rings having a disc shaped base portion and an annular flange extending from the periphery of said base in a direction away from said spacer, washers on said piston rod within said sealing rings, said washers having a depth slightly less than the depth of said flanges and a diameter less than the diameter of said flanges for providing a space between said washers and said rings, the base of each of said rings being clamped between adjacent washers, the outermost only of said rings being formed with an orifice through the base communicating with the space between the adjacent washer and ring and means securing said washers and said rings on said rod.

WALTER B. RICHARDSON.

REFERENCES CITED

The following references are of record in the file of this patent:

UNITED STATES PATENTS

| Number | Name | Date |
|---|---|---|
| 1,215,445 | Waller | Feb. 13, 1917 |
| 1,651,131 | Joyce | Nov. 29, 1927 |
| 1,685,081 | Brady | Sept. 25, 1928 |
| 1,771,890 | Hubbard et al. | July 29, 1930 |
| 1,868,668 | Mahon | July 26, 1932 |
| 2,145,384 | Allin | Jan. 31, 1939 |
| 2,307,067 | Paulus | Jan. 5, 1943 |